(12) United States Patent
Zhou et al.

(10) Patent No.: US 9,068,118 B2
(45) Date of Patent: Jun. 30, 2015

(54) LUMINESCENT MATERIAL OF GALLIUM INDIUM OXIDE AND PREPARATION METHOD THEREOF

(75) Inventors: Mingjie Zhou, Guangdong (CN); Jun Liu, Guangdong (CN); Wenbo Ma, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 164 days.

(21) Appl. No.: 13/881,161

(22) PCT Filed: Dec. 20, 2010

(86) PCT No.: PCT/CN2010/080023
§ 371 (c)(1),
(2), (4) Date: Apr. 24, 2013

(87) PCT Pub. No.: WO2012/083517
PCT Pub. Date: Jun. 28, 2012

(65) Prior Publication Data
US 2013/0234077 A1    Sep. 12, 2013

(51) Int. Cl.
*C09K 11/08* (2006.01)
*C09K 11/02* (2006.01)
(Continued)

(52) U.S. Cl.
CPC ............. *C09K 11/873* (2013.01); *C09K 11/621* (2013.01)

(58) Field of Classification Search
CPC .... C09K 11/62; C09K 11/621; C09K 11/805; C09K 11/87; C09K 11/873; B82Y 10/00
USPC ............... 252/301.4 R, 514; 264/21; 977/773
See application file for complete search history.

(56) References Cited

U.S. PATENT DOCUMENTS

| 5,858,278 A | 1/1999 | Itoh et al. |
| 2003/0230739 A1 | 12/2003 | Comanzo et al. |

(Continued)

FOREIGN PATENT DOCUMENTS

| CN | 101262017 A | 9/2008 |
| JP | 2005232436 A | 9/2005 |
| JP | 2006524271 A | 10/2006 |

OTHER PUBLICATIONS

First Office Action in corresponding Japanese Application No. 2013-544996 mailed Jul. 8, 2014.

(Continued)

*Primary Examiner* — Carol M Koslow
*Assistant Examiner* — Lynne Edmondson
(74) *Attorney, Agent, or Firm* — Renner, Otto, Boisselle & Sklar, LLP

(57) ABSTRACT

A luminescent material of gallium indium oxide and preparation method thereof are provided. The luminescent material of gallium indium oxide has a chemical formula of $GaInO_3$: $zM$, wherein, M is the metal nano-particle which is selected from one or two of Ag, Au, Pt and Pd, and z meets the condition of $1\times10^{-5} \leq z \leq 0.02$. The method for preparing the luminescent material comprises the following steps: (1) preparing the mixed solution containing indium ion and gallium ion; (2) adding chelator and crosslinking agent into the mixed solution to obtain a chelate solution; (3) adding M nano-particles sol which is surface treated into the chelate solution, heating by water-bath and stirring, drying to obtain the precursor of the luminescent material; (4) preheating the precursor, cooling, grinding, calcining, then cooling and grinding again to obtain the luminescent material.

11 Claims, 1 Drawing Sheet

A — Preparing M metal nano-particles sol

B — Preparing luminescent material of $GaInO_3$, with $zM$

(51) Int. Cl.
*C09K 11/87* (2006.01)
*C09K 11/62* (2006.01)

(56) References Cited

U.S. PATENT DOCUMENTS

2007/0159090 A1* 7/2007 Kitai et al. .................. 313/509

2008/0164801 A1* 7/2008 Min et al. ..................... 313/309

OTHER PUBLICATIONS

International Search Report for corresponding International Application No. PCT/CN2010/080023 mailed Oct. 13, 2011.

* cited by examiner

LUMINESCENT MATERIAL OF GALLIUM INDIUM OXIDE AND PREPARATION METHOD THEREOF

This application is a national phase of International Application No. PCT/CN2010/080023 filed Dec. 20, 2010.

TECHNICAL FIELD

The present invention relates to the field of luminescent materials, and in particular relates to a gallium indium oxide luminescent material doped with metal nanoparticles. The present invention also relates to a method for preparing a gallium indium oxide luminescent material.

BACKGROUND ART

Currently, commercially available luminescent materials for the field emission excitation may be divided into two main categories: sulfide systems, such as blue powders $ZnS:Ag,Cl$ and $SrGa_2S_4:Ce$, green powder $SrGa_2S_4:Eu$, and red powder $Y_2O_2S:Eu$; and oxide systems, such as blue powder $Y_2SiO_5:Ce$, green powders $ZnGa_2O_4:Mn$, $Y_2SiO_5:Tb$ and $Y_3Al_5O_{12}:Tb$, and red powder $Y_2O_3:Eu$. However, the sulfide series has relatively poor stabilities. The oxide series has lower electrical conductivities than the sulfide series. Moreover, their luminescent intensities need to be improved. In order to improve the electrical conductivity of a luminescent material, the surface of the luminescent material may be coated with a conductive material, such as $In_2O_3$, $SnO_2$, $ZnO$, etc., and luminescent materials having certain electrical conductivities are studied.

SUMMARY

In order to solve the above problems, the present invention provides a gallium indium oxide luminescent material doped with metal nanoparticles, which has high electrical conductivity and good chemical stability.

The gallium indium oxide luminescent material has a chemical formula of: $GaInO_3$, with zM; wherein M represents a metal nanoparticle which may be one or two selected from the group consisting of Ag, Au, Pt and Pd, and z may be in the range of $1 \times 10^{-5} \leq z \leq 0.02$.

Another object of the present invention is to provide a method for preparing the above gallium indium oxide luminescent material, which comprises the steps of:

Step S1, adding a source compound of In and a source compound of Ga according to the stoichiometric ratio of the corresponding elements in the chemical formula $GaInO_3$ into a mixed solvent of water and ethanol having a volume ratio of 1:1 to 1:4 to prepare a mixed solution containing In ions and Ga ions;

Step S2, adding a chelating agent and a crosslinking agent into the mixed solution obtained in Step 51 to prepare a chelating solution;

Step S3, adding a surface-treated M nanoparticle sol into the chelating solution prepared in Step S2, and heating in a water bath while stirring, and then drying to give a precursor having a chemical formula of $GaInO_3$, with zM; wherein M represents a metal nanoparticle which may be one or two selected from the group consisting of Ag, Au, Pt and Pd, and z may be in the range of $1 \times 10^{-5} \leq z \leq 0.02$; and Step S4, pre-calcinating the precursor obtained in Step S3, cooling, grinding, and then calcinating, cooling and grinding again to obtain the gallium indium oxide luminescent material having a chemical formula of $GaInO_3$, with zM.

In Step S1 of the above production method, the source compound of In and the source compound of Ga may be corresponding nitrates thereof, respectively.

In Step S2 of the above production method, the chelating agent may be citric acid monohydrate, and the molar ratio of the chelating agent to the overall metal ions (Ga ions and In ions, i.e., trivalent Ga ions and trivalent In ions) in the mixed solution may be 1:1 to 5:1; the crosslinking agent may be polyethylene glycol with a molecular weight of 2000-20000, and the molar ratio of the crosslinking agent to $GaInO_3$ may be 0 to 1:100.

In Step S3 of the above preparation method, the surface-treated M nanoparticle sol may be prepared with the steps of:

Step S31, weighing a source compound of M and dissolving and diluting it into water or a mixed solvent of ethanol and water having a volume ratio of 1:7 to 4:1 to prepare a mixed solution containing M ions with a molar concentration of $2.4 \times 10^{-4}$ to $3 \times 10^{-3}$ mol/L;

Step S32, sequentially adding an additive and a solution of a reducing agent to the mixed solution obtained in Step S31 and stirring to obtain an M nanoparticle sol; wherein the additive may be at least one of polyvinyl pyrrolidone, sodium citrate, cetyl trimethyl ammonium bromide, sodium dodecyl sulfate and sodium dodecyl sulfonate; the amount of the additive may be such that the content thereof in the final M nanoparticle sol is $1.5 \times 10^{-4}$ g/mL to $2.1 \times 10^{-3}$ g/mL; the molar concentration of the solution of the reducing agent may be $1 \times 10^{-3}$ mol/L to $1 \times 10^{-2}$ mol/L; the reducing agent in the solution of the reducing agent may be at least one of hydrazine hydrate, ascorbic acid and sodium borohydride; the solvent in the solution of the reducing agent may be water or water and ethanol having a volume ratio of 9:1 to 1:1; and the molar ratio of the reducing agent to the M ions may be 1.2:1 to 4.8:1; and Step S33, adding the M nanoparticle sol obtained in Step S32 into a solution containing a surface-treating agent, and stirring to obtain a surface-treated M nanoparticle sol; wherein the surface-treating agent is polyvinyl pyrrolidone; and the surface-treating agent is added in an amount of 0.0002 g/mL to 0.1 g/mL.

In Step S3 of the above preparation method, the process of heating in a water bath while stirring comprises: heating in a water bath at 60 to 90° C. while stirring; and the process of drying comprises: blast drying first at 60 to 80° C., followed by oven drying at 80 to 150° C.

In Step S4 of the above preparation method, the pre-calcinating treatment comprises: pre-calcinating at 500° C. to 900° C. for 2 to 10 h; and the calcinating treatment comprises: calcinating at 800 to 1300° C. for 1 to 8 h.

Compared with the prior art, the present invention has the following advantages.

1. Comparing the luminescent material $GaInO_3$, with zM obtained in the present invention with the luminescent material $GaInO_3$ without being added with metal ions, the luminous intensity of the luminescent material of the present invention increases by more than 90%.

2. The obtained luminescent material $GaInO_3$, with zM does not need ball-milling, and has advantages such as good stability, uniform particle size, high luminescent efficiency, etc., and can be used in field emission displays or illumination field due to its light emission under a cathode-ray excitation.

3. The luminescent material of the present invention can be prepared with a method which is simple to operate, pollution-free and easy to control, has low requirements on the equipments, and is suitable for industrial production, and can be widely used in the field of the preparation of luminescent materials.

SPECIFIC EMBODIMENTS

The present invention provides a gallium indium oxide luminescent material, which has a chemical formula of: $GaInO_3$, with zM; wherein M represents a metal nanoparticle which may be one or two selected from the group consisting of Ag, Au, Pt and Pd, and z may be in the range of $1\times10^{-5} \leq z \leq 0.02$.

Figure 1:
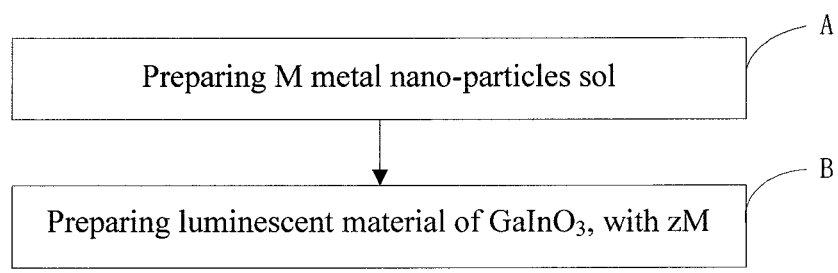
FIG. 1 shows a flow chart of the method for preparing the gallium indium oxide luminescent material according to the present invention.

The present invention further provides a method for preparing the above luminescent material, which, as shown in FIG. 1, comprising the following steps.

Step A: Preparation of a Metal Nanoparticle Sol.

1) A source compound of M is weighed and dissolved in water or a mixed solvent of ethanol and water having a volume ratio of 1:7 to 4:1, formulated and diluted to a mixed solution containing M ions with a molar concentration of $2.4\times10^{-4}$ to $3\times10^{-3}$ mol/L; wherein M represents a metal nanoparticle which may be one or two selected from Ag, Au, Pt and Pd, and the source compound of M may be one or two selected from silver nitrate, chloroauric acid, chloroplatinic acid and palladium chloride.

2) An additive is dissolved in the solution obtained in the above step 1) under magnetic stirring, so that the content of the additive in the finally obtained M nanoparticle sol is $1.5\times10^{-4}$ g/mL to $2.1\times10^{-3}$ g/mL; wherein the additive may be at least one of polyvinyl pyrrolidone (PVP), sodium citrate, cetyl trimethyl ammonium bromide, sodium dodecyl sulfate and sodium dodecyl sulfonate.

3) A reducing agent is weighed and dissolved in water or a mixed solvent of water and ethanol having a volume ratio of 9:1 to 1:1 to prepare a solution of the reducing agent having a concentration of $1\times10^{-3}$ mol/L to $1\times10^{-2}$ mol/L; wherein the reducing agent may be at least one of hydrazine hydrate, ascorbic acid, or sodium borohydride.

4) The solution of the reducing agent obtained in the above step 3) is added into the solution of the M nanoparticle sol containing the additive obtained in the above step 2) under magnetic stirring, so that the molar ratio of the reducing agent to the M ions is 1.2:1 to 4.8:1. After the whole system is reacted for 10 min to 45 min, an M nanoparticle sol is obtained.

5) Based on the total volume of the M nanoparticle sol prepared in step 4), a solution of a surface-treating agent, such as polyvinyl pyrrolidone (PVP), is weighed and added into the M nanoparticle sol prepared in step 4), and stirred for 3 to 24 h to give a surface-treated M nanoparticle sol, which is stored for further use; wherein the amount of the surface-treating agent may be 0.0002 g/mL to 0.1 g/mL relative to the total volume.

Step B: Prepartion of $GaInO_3$, with zM

6) A source compound of In and a source compound of Ga according to the stoichiometric ratio of the elements in the chemical formula $GaInO_3$ are added into a mixed solvent of water and ethanol having a volume ratio of 1:1 to 1:4 to prepare a mixed solution containing In ions and Ga ions; wherein the source compound of In and the source compound of Ga may be corresponding nitrates thereof, respectively.

7) A chelating agent, such as citric acid monohydrate, and a crosslinking agent, such as polyethylene glycol with a molecular weight of 10000, are sequentially added into the mixed solution obtained in step 6) to give a chelating solution; wherein the molar ratio of the chelating agent to the overall metal ions (trivalent Ga ions $Ga^{3+}$ and trivalent In ions $In^{3+}$) in the mixed solution may be 1:1 to 5:1; and the molar ratio of the crosslinking agent to $GaInO_3$ may be 0 to 1:100.

8) The surface-treated M nanoparticle sol obtained in step 5) is added to the chelating solution obtained in step 7), and heated in a water bath at 60 to 90° C. and stirred for 2 to 6 h, followed by blast drying at 60 to 80° C. and oven drying at 80 to 150° C. to give a precursor of $GaInO_3$, with zM.

9) The precursor obtained in step 8) is pre-calcinated at 500° C. to 900° C. for 2 to 10 h, cooled, ground, and then calcinated at 800 to 1300° C. for 1 to 8 h, cooled and ground again to give the gallium indium oxide luminescent material having a chemical formula of $GaInO_3$, with zM.

The innovations of the present invention lie in that metal nanoparticles are doped in the $GaInO_3$ luminescent material and the luminous intensity of the luminescent material is increased through the surface plasmon resonance generated at the surface of the metal particles. This is because the surface plasmon (SP) is a wave propagating along the interface of the metal and the medium, and the amplitude thereof exponentially decays with the increase of the distance away from the interface. When metal particles are attached to the surface of the luminescent material, the nature, the dispersion relation, the excitation mode, the coupling effects, etc., of the surface plasmon polaritons (SPPs) would significantly change. The electromagnetic field induced by SPPs can not only limit the propagating of light waves in a sub-wavelength structure, but also generate and control electromagnetic radiations in the range of from optical frequency to microwave band, so as to achieve active manipulation of the light propagation, increase the optical density of the luminescent material and enhance the spontaneous radiation rate. Moreover, by means of the coupling effect of the surface plasmon, the internal quantum efficiency of the luminescent material can be greatly improved, so that the luminous intensity of the luminescent material is increased.

In the following, the preferred embodiments of the present invention will be further described in detail in combination with the accompanying drawings.

In the following Examples, the molecular weight of polyethylene glycol is 2000 to 20000.

Example 1

Preparation of $GaInO_3:2\times10^{-2}$ Au by Sol-Gel Method

Preparation of Au Nanoparticle Sol 20.6 mg of chloroauric acid ($AuCl_3 \cdot HCl \cdot 4H_2O$) is weighed and dissolved in 16.8 mL of deionized water. After chloroauric acid is completely dissolved, 14 mg of sodium citrate and 6 mg of cetyl trimethyl ammonium bromide are weighed and dissolved in the aqueous solution of chloroauric acid under magnetic stirring. 1.9 mg of sodium borohydride and 17.6 mg of ascorbic acid are dissolved in 10 mL of deionized water, respectively, to give 10 mL of an aqueous solution of sodium borohydride having a concentration of $5\times10^{-3}$ mol/L and 10 mL of an aqueous solution of ascorbic acid having a concentration of $1\times10^{-2}$ mol/L. Under magnetic stirring, 0.08 mL of the aqueous solution of sodium borohydride is added to the aqueous solution of chloroauric acid and stirred for 5 min, followed by adding 3.12 mL of the aqueous solution of ascorbic acid into the aqueous solution of chloroauric acid and reacting for further 30 min, to give 20 mL of Au nanoparticle sol having an Au content of $5\times10^{-3}$ mol/L. 2 g of PVP is added and magnetically stirred for 8 h to give the surface-treated Au nanoparticles.

Preparation of $GaInO_3$:$2\times10^{-2}$ Au 5.0 ml of 1 mol/L $In(NO_3)_3$ solution and 5 ml of 1 mol/L $Ga(NO_3)_3$ solution are added into a beaker, to which are added 5 ml of water and 15 ml of ethanol. To the above solution is added a mixed solution containing 2.1012 g of citric acid monohydrate in 10 ml water-10 ml ethanol. 20 mL of the above treated $5\times10^{-3}$ mol/L Au nanoparticle sol is then added dropwise. The obtained solution is heated in a water bath at 60° C. under stirring until a wet gel is formed.

The wet gel is dried overnight in a blast oven at 60° C., and then dried completely at 110° C., to give a precursor, which is placed in a high-temperature furnace and pre-calcinated at 500° C. for 2 h, cooled down to room temperature, ground, then placed in a high-temperature box furnace and calcinated at 800 for 8 h, naturally cooled down and taken out to give the desired luminescent material $GaInO_3$:$2\times10^{-2}$Au.

Example 2

Preparation of $GaInO_3$:$1\times10^{-3}$Ag by Sol-Gel Method

Preparation of Ag Nanoparticle Sol 3.40 mg of silver nitrate ($AgNO_3$) is weighed and dissolved in 2.3 ml of ethanol and 16.1 ml of deionized water. After silver nitrate is completely dissolved, 42 mg of sodium citrate is weighed and dissolved in the aqueous solution of silver nitrate under magnetic stirring. 5.7 mg of sodium borohydride is dissolved in 9 mL of deionized water and 1 ml of ethanol to give 10 mL of an aqueous solution of sodium borohydride having a concentration of $1.5\times10^{-2}$ mol/L. Under magnetic stirring, 1.6 mL of the $1.5\times10^{-2}$ mol/L aqueous solution of sodium borohydride is added in one portion to the aqueous solution of silver nitrate, followed by reaction for 10 min, to give 20 ml of Ag nanoparticle sol having a silver content of $1\times10^{-3}$ mol/L. 4 mg of PVP is added and magnetically stirred for 12 h to give the surface-treated Ag nanoparticles.

Preparation of $GaInO_3$:$1\times10^{-3}$Ag 5.0 ml of 1 mol/L $In(NO_3)_3$ solution and 5 ml of 1 mol/L $Ga(NO_3)_3$ solution are added into a beaker, to which are added 5 ml of water and 30 ml of ethanol. To the above solution is added a mixed solution containing 4.2028 g of citric acid monohydrate (2 times of the molar amount of the metal ions) in 10 ml water-20 ml ethanol. 0.5 g of polyethylene glycol (molecular weight: 10000) is then added and dissolved completely. 5 mL of the above treated $1\times10^{-3}$ mol/L Ag nanoparticle sol is then added dropwise into the beaker. The obtained solution is heated in a water bath at 70° C. under stirring until a wet gel is formed.

The wet gel is dried overnight in a blast oven at 70° C., and then dried completely at 120° C., to give a precursor, which is placed in a high-temperature furnace and pre-calcinated at 800° C. for 4 h, cooled down to room temperature, ground, then placed in a high-temperature box furnace and calcinated at 1000 for 3 h, naturally cooled down and taken out to give the desired luminescent material $GaInO_3$:$1\times10^{-3}$Ag.

Example 3

Preparation of $GaInO_3$:$1\times10^{-4}$ Pt by Sol-Gel Method

Preparation of Pt Nanoparticle Sol 5.18 mg of chloroplatinic acid ($H_2PtCl_6.6H_2O$) is weighed and dissolved in 13.6 ml of ethanol and 3.4 mL of deionized water. After chloroplatinic acid is completely dissolved, 8.0 mg of sodium citrate and 12.0 mg sodium dodecyl sulfonate are weighed and dissolve in the aqueous solution of chloroplatinic acid under magnetic stirring. 0.38 mg of sodium borohydride is dissolved in 5 ml of ethanol and 5 mL of deionized water to give 10 mL of an aqueous solution of sodium borohydride having a concentration of $1\times10^{-3}$ mol/L. 10 mL of a solution of hydrazine hydrate having a concentration of $1\times10^{-2}$ mol/L is similarly prepared. Under magnetic stirring, 0.4 mL of the aqueous solution of sodium borohydride is added dropwise to the aqueous solution of chloroplatinic acid and stirred for 5 min, followed by adding dropwise 2.6 mL of the $1\times10^{-2}$ mol/L solution of hydrazine hydrate into the aqueous solution of chloroplatinic acid and reacting for further 40 min, to give 20 mL of Pt nanoparticle sol having a Pt content of $5\times10^{-4}$ mol/L. 20 mg of PVP is added and magnetically stirred for 12 h to give the surface-treated Pt nanoparticles.

Preparation of $GaInO_3$:$1\times10^{-4}$ Pt 5.0 ml of 1 mol/L $In(NO_3)_3$ solution and 5 ml of 1 mol/L $Ga(NO_3)_3$ solution are added into a beaker, to which are added 5 ml of water and 60 ml of ethanol. To the above solution is added a mixed solution containing 6.3042 g of citric acid monohydrate (3 times of the molar amount of the metal ions) in 10 ml water-40 ml ethanol. 1.5 g of polyethylene glycol (molecular weight: 20000) is then added and dissolved completely. 1 mL of the above treated $5\times10^{-4}$ mol/L Pt nanoparticle sol is then added dropwise into the beaker. The obtained solution is heated in a water bath at 80° C. under stirring until a wet gel is formed.

The wet gel is dried overnight in a blast oven at 80° C., and then dried completely at 150° C., to give a precursor, which is placed in a high-temperature furnace and pre-calcinated at 900° C. for 10 h, cooled down to room temperature, ground, then placed in a high-temperature box furnace and calcinated at 1200 for 2 h, naturally cooled down and taken out to give the desired luminescent material $GaInO_3$:$1\times10^{-4}$ Pt.

Example 4

Preparation of $GaInO_3$:$1\times10^{-5}$ Pd by Sol-Gel Method

Preparation of Pd Nanoparticle Sol 0.43 mg of palladium chloride ($PdCl_2.2H_2O$) is weighed and dissolved in 3.5 mL of ethanol and 5 mL of deionized water. After palladium chloride is completely dissolved, 11.0 mg of sodium citrate and 4.0 mg of sodium dodecyl sulfate are weighed and dissolved in the aqueous solution of palladium chloride under magnetic stirring. 3.8 mg of sodium borohydride is dissolved in 8 mL of deionized water and 2 ml of ethanol to give a reductive solution of sodium borohydride having a concentration of $1\times10^{-2}$ mol/L. Under magnetic stirring, 0.48 mL of the $1\times10^{-2}$ mol/L aqueous solution of sodium borohydride is added rapidly to the aqueous solution of palladium chloride and reacted for 20 min to give 20 mL of Pd nanoparticle sol having a Pd content of $1\times10^{-4}$ mol/L. 10 mg of PVP is added and magnetically stirred for 8 h to give the surface-treated Pd nanoparticles.

Preparation of GaInO$_3$:1×10$^{-5}$Pd 5.0 ml of 1 mol/L In(NO$_3$)$_3$ solution and 5 ml of 1 mol/L Ga(NO$_3$)$_3$ solution are added into a beaker, to which are added 5 ml of water and 20 ml of ethanol. To the above solution is added a mixed solution containing 8.4056 g of citric acid monohydrate (4 times of the molar amount of the metal ions) in 10 ml water-20 ml ethanol. 3 g of polyethylene glycol (molecular weight: 6000) is then added and dissolved completely. 0.5 mL of the above treated 1×10$^{-4}$ mol/L Pd nanoparticle sol is then added dropwise into the beaker. The obtained solution is heated in a water bath at 90° C. under stirring until a wet gel is formed.

The wet gel is dried overnight in a blast oven at 80° C., and then dried completely at 120° C., to give a precursor, which is placed in a high-temperature furnace and pre-calcinated at 800° C. for 4 h, cooled down to room temperature, ground, then placed in a high-temperature box furnace and calcinated at 1300 for 1 h, naturally cooled down and taken out to give the desired luminescent material GaInO$_3$:1×10$^{-5}$ Pd.

Example 5

Preparation of GaInO$_3$:2×10$^{-5}$Pt/Au by Sol-Gel Method

Preparation of Pt/Au Nanoparticle Sol 10.7 mg of chloroauric acid (AuCl$_3$.HCl.4H$_2$O) and 13.56 mg of chloroplatinic acid (H$_2$PtCl$_6$.6H$_2$O) are weighed and dissolved in 28 mL of deionized water. After the materials are completely dissolved, 22 mg of sodium citrate and 20 mg of PVP are weighed and dissolved in the above mixed solution under magnetic stirring. 5.7 mg of newly prepared sodium borohydride is weighed dissolved in 10 mL of deionized water to give 10 mL of an aqueous solution of sodium borohydride having a concentration of 1.5×10$^{-2}$ mol/L. Under magnetic stirring, 4 mL of the aqueous solution of sodium borohydride is added in one portion to the above mixed solution and reacted for 20 min to give 30 mL of Pt/Au nanoparticle sol having a overall metal content of 1.7×10$^{-3}$ mol/L. 100 mg of PVP is added to the Pt/Au nanoparticle sol and magnetically stirred for 6 h to give the surface-treated Pt/Au nanoparticles.

Preparation of GaInO$_3$:2×10$^{-5}$Pt/Au 5.0 ml of 1 mol/L In(NO$_3$)$_3$ solution and 5 ml of 1 mol/L Ga(NO$_3$)$_3$ solution are added into a beaker, to which are added 5 ml of water and 20 ml of ethanol. To the above solution is added a mixed solution containing 10.507 g of citric acid monohydrate (5 times of the molar amount of the metal ions) in 10 ml water-20 ml ethanol. 2.5 g of polyethylene glycol (molecular weight: 2000) is then added and dissolved completely. 0.06 mL of the above treated 1.7×10$^{-3}$ mol/L Pt/Au nanoparticle sol is then added dropwise into the beaker. The obtained solution is heated in a water bath at 80° C. under stirring until a wet gel is formed.

The wet gel is dried overnight in a blast oven at 80° C., and then dried completely at 100° C., to give a precursor, which is placed in a high-temperature furnace and pre-calcinated at 850° C. for 5 h, cooled down to room temperature, ground, then placed in a high-temperature box furnace and calcinated at 1300 for 1 h, naturally cooled down and taken out to give the desired luminescent material GaInO$_3$:2×10$^{-5}$Pt/Au.

Example 6

Preparation of GaInO$_3$:4×10$^{-4}$Ag by Sol-Gel Method

Preparation of Ag Nanoparticle Sol 3.40 mg of silver nitrate (AgNO$_3$) is weighed and dissolved in 18.4 mL of deionized water. After silver nitrate is completely dissolved, 42 mg of sodium citrate is weighed and dissolved in the aqueous solution of silver nitrate under magnetic stirring. 5.7 mg of sodium borohydride is weighed and dissolved in 10 mL of deionized water to give 10 mL of an aqueous solution of sodium borohydride having a concentration of 1.5×10$^{-2}$ mol/L. Under magnetic stirring, 1.6 mL of the 1.5×10$^{-2}$ mol/L aqueous solution of sodium borohydride is added in one portion to the aqueous solution of silver nitrate and reacted for 10 min to give 20 mL of Ag nanoparticle sol having an Ag content of 1×10$^{-3}$ mol/L. 4 mg of PVP is added and magnetically stirred for 12 h to give the surface-treated Ag nanoparticles.

Preparation of GaInO$_3$:4×10$^{-4}$Ag 5.0 ml of 1 mol/L In(NO$_3$)$_3$ solution and 5 ml of 1 mol/L Ga(NO$_3$)$_3$ solution are added into a beaker, to which are added 5 ml of water and 20 ml of ethanol. To the above solution is added a mixed solution containing 4.2028 g of citric acid monohydrate (2 times of the molar amount of the metal ions) in 10 ml water-20 ml ethanol. 2 g of polyethylene glycol (molecular weight: 10000) is then added and dissolved completely. 2 mL of the above treated 1×10$^{-3}$ mol/L Ag nanoparticle sol is then added dropwise into the beaker. The obtained solution is heated in a water bath at 75° C. under stirring until a wet gel is formed.

The wet gel is dried overnight in a blast oven at 75° C., and then dried completely at 80° C., to give a precursor, which is placed in a high-temperature furnace and pre-calcinated at 600° C. for 5 h, cooled down to room temperature, ground, then placed in a high-temperature box furnace and calcinated at 900 for 4 h, naturally cooled down and taken out to give the desired luminescent material GaInO$_3$:4×10$^{-4}$Ag.

Figure 2:
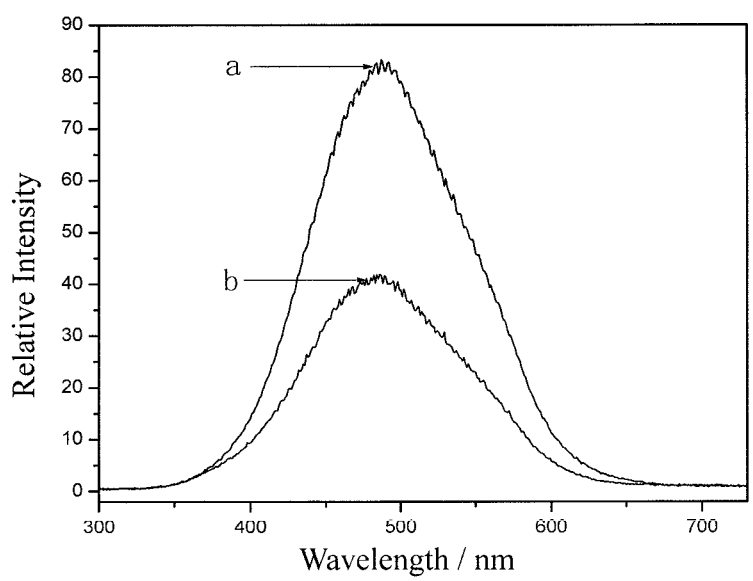
FIG. 2 shows the comparison of the luminescent spectrum of the fluorescent powder prepared in Example 6 of the present invention under a cathode-ray excitation at an acceleration voltage of 7.0 kV; wherein curve a is the emission spectrum of the luminescent material doped with metal nanoparticles, $GaInO_3:4\times10^{-4}Ag$; curve b is the emission spectrum of the luminescent material $GaInO_3$.

FIG. 2 shows the comparison of the luminescent spectrum of the fluorescent powder prepared in Example 6 of the present invention under a cathode-ray excitation at an acceleration voltage of 7.0 kV; wherein curve a is the emission spectrum of the luminescent material doped with metal nanoparticles, GaInO$_3$:4×10$^{-4}$Ag; curve b is the emission spectrum of the luminescent material GaInO$_3$. As shown in FIG. 2 after being doped with Ag metal, the luminous intensity of the luminescent material increases by 85%; and the integrated area thereof increases by 97%.

It should be understood that detailed description of the preferred embodiments of the present invention is provided above, which shall not be considered a limitation to the protection scope of the present invention, and the protection scope of the present invention should subject to the appended claims.

The invention claimed is:

1. A gallium indium oxide luminescent material, wherein the chemical formula of the luminescent material is GaInO$_3$ with zM; wherein M represents a metal nanoparticle which is one or two selected from the group consisting of Ag, Au, Pt and Pd, and z is in the range of $1\times10^{-5} \leq z \leq 0.02$.

2. A method for preparing a gallium indium oxide luminescent material, comprising the steps of:

Step S1, adding a source compound of In and a source compound of Ga according to stoichiometric ratio of corresponding elements in chemical formula GaInO$_3$ into a mixed solvent of water and ethanol to prepare a mixed solution containing In ions and Ga ions;

Step S2, adding a chelating agent and optionally a crosslinking agent into the mixed solution obtained in Step 51 to prepare a chelating solution;

Step S3, adding a surface-treated M nanoparticle sol into the chelating solution prepared in Step S2, and heating in a water bath while stirring, and then drying to give a precursor having a chemical formula of GaInO$_3$ with zM; wherein M represents a metal nanoparticle which is one or two selected from the group consisting of Ag, Au, Pt and Pd, and z is in the range of $1\times10^{-5} \leq z \leq 0.02$; and Step S4, pre-calcinating the precursor obtained in Step S3, cooling, grinding, and then calcinating, cooling and grinding again to obtain the gallium indium oxide luminescent material having a chemical formula of $GaInO_3$ with zM.

3. The method for preparing a gallium indium oxide luminescent material according to claim 2, wherein, in Step S1, the source compound of In and the source compound of Ga are corresponding nitrates thereof, respectively.

4. The method for preparing a gallium indium oxide luminescent material according to claim 2, wherein, in Step S2, the chelating agent is citric acid monohydrate, and the molar ratio of the chelating agent to the overall metal ions (Ga ions and In ions) in the mixed solution is 1:1 to 5:1.

5. The method for preparing a gallium indium oxide luminescent material according to claim 2, wherein, in Step S2, the crosslinking agent is polyethylene glycol with a molecular weight of 2000-20000, and the molar ratio of the crosslinking agent to $GaInO_3$ is 0 to 1:100.

6. The method for preparing a gallium indium oxide luminescent material according to claim 2, wherein, in Step S3, the surface-treated M nanoparticle sol is prepared with the steps of:

Step S31, weighing a source compound of M and dissolving and diluting it into water or a mixed solvent of ethanol and water having a volume ratio of 1:7 to 4:1 to prepare a mixed solution containing M ions with a molar concentration of $2.4\times10^{-4}$ to $3\times10^{-3}$ mol/L;

Step S32, sequentially adding an additive and a solution of a reducing agent to the mixed solution obtained in Step S31 and stirring to obtain an M nanoparticle sol; and Step S33, adding the M nanoparticle sol obtained in Step S32 into a solution containing a surface-treating agent and stirring to obtain a surface-treated M nanoparticle sol.

7. The method for preparing a gallium indium oxide luminescent material according to claim 6, wherein, in Step S32,
the additive is at least one of polyvinyl pyrrolidone, sodium citrate, cetyl trimethyl ammonium bromide, sodium dodecyl sulfate and sodium dodecyl sulfonate; the amount of the additive is such that the content thereof in the final M nanoparticle sol is $1.5\times10^{-4}$ g/mL to $2.1\times10^{-3}$ g/mL;

the molar concentration of the solution of the reducing agent is $1\times10^{-3}$ mol/L to $1\times10^{-2}$ mol/L; the reducing agent in the solution of the reducing agent is at least one of hydrazine hydrate, ascorbic acid and sodium borohydride; the solvent in the solution of the reducing agent is water or a mixed solvent of water and ethanol; and the molar ratio of the reducing agent to the M ions is 1.2:1 to 4.8:1.

8. The method for preparing a gallium indium oxide luminescent material according to claim 6, wherein, in Step S33, the surface-treating agent is polyvinyl pyrrolidone; and the surface-treating agent is added in an amount of 0.0002 g/mL to 0.1 g/mL.

9. The method for preparing a gallium indium oxide luminescent material according to claim 2, wherein, in Step S3, the process of heating in a water bath while stirring comprises: heating in a water bath at 60 to 90° C. while stirring; and the process of drying comprises: blast drying first at 60 to 80° C., followed by oven drying at 80 to 150° C.

10. The method for preparing a gallium indium oxide luminescent material according to claim 2, wherein, in Step S4, the pre-calcinating treatment comprises: pre-calcinating at 500° C. to 900° C. for 2 to 10 h; and the calcinating treatment comprises:

calcinating at 800 to 1300° C. for 1 to 8 h.

11. The method for preparing a gallium indium oxide luminescent material according to claim 4, wherein, in Step S2, the crosslinking agent is polyethylene glycol with a molecular weight of 2000-20000, and the molar ratio of the crosslinking agent to $GaInO_3$ is 0 to 1:100.

\* \* \* \* \*